US011093583B2

(12) United States Patent
Soderman et al.

(10) Patent No.: US 11,093,583 B2
(45) Date of Patent: Aug. 17, 2021

(54) METHOD AND SYSTEM FOR IMPROVING THE EVALUATION OF AN INTERACTION BETWEEN AN ANALYTE AND A LIGAND USING A BIOSENSOR

(71) Applicant: CYTIVA SWEDEN AB, Uppsala (SE)

(72) Inventors: Tobias Soderman, Uppsala (SE); Viveca Lindahl, Stockholm (SE)

(73) Assignee: Cytiva Sweden AB, Uppsala (SE)

( * ) Notice: Subject to any disclaimer, the term of this patent is extended or adjusted under 35 U.S.C. 154(b) by 273 days.

(21) Appl. No.: 15/761,570

(22) PCT Filed: Sep. 29, 2016

(86) PCT No.: PCT/EP2016/073271
§ 371 (c)(1),
(2) Date: Mar. 20, 2018

(87) PCT Pub. No.: WO2017/055461
PCT Pub. Date: Apr. 6, 2017

(65) Prior Publication Data
US 2018/0341624 A1 Nov. 29, 2018

(30) Foreign Application Priority Data
Sep. 30, 2015 (GB) .................................... 1517279.4

(51) Int. Cl.
G06F 17/18 (2006.01)
(52) U.S. Cl.
CPC .................................... G06F 17/18 (2013.01)

(58) Field of Classification Search
None
See application file for complete search history.

(56) References Cited

U.S. PATENT DOCUMENTS

2005/0014179 A1* 1/2005 Karlsson .............. G01N 33/543
435/6.1
2013/0273564 A1* 10/2013 Quinn .................... G01N 33/53
435/7.8

FOREIGN PATENT DOCUMENTS

WO 2012074473 A1 6/2012

OTHER PUBLICATIONS

Jacoby, William G., "Regression III: Advanced Methods", Apr. 22, 2015, Michigan State University. (Year: 2015).*

(Continued)

Primary Examiner — Cedric Johnson
(74) Attorney, Agent, or Firm — Jeff B. Vockrodt; Culhane Meadows, PLLC (57) ABSTRACT

Methods and biosensor systems for improved evaluation of an interaction between an analyte in a fluid sample and a ligand immobilized on a sensor surface of a biosensor are provided. In one example, a method is provided which includes allowing a plurality of fluid samples to flow across a first sensor surface and a second sensor surface having a ligand immobilized thereon, where the fluid samples include a solvent (for example, an organic solvent with bulk effects such as DMSO) at known concentrations. The method further includes creating a data set for each fluid sample and forming a clean data set with outliers removed. Software for performing steps of methods disclosed and a computer readable medium for storing the software are also provided.

9 Claims, 8 Drawing Sheets

(56) References Cited

OTHER PUBLICATIONS

Workshop Series—Strategies for Working with Small Molecules "Protocol for Measuring Small Molecule Interactions using Biacore: A Practical Guide to Experimental Design and Data Evaluation", 2002, Biacore Symposium (Year: 2002).*
GB Search Report and Opinion for corresponding GB application No. GB1517279.4 dated Jul. 7, 2016; 3 pages.
International Search Report and Written Opinion for corresponding PCT application No. PCT/EP2016/073271 dated Feb. 21, 2017; 18 pages.
Unknown; "Biacore T100 Software Handbook", Feb. 2006, pp. 1-198. Retrieved from the Internet: URL:http://www.biophysics.bioc.cam.ac.uk/wp-content/uploads/2011/02/T100_Software_Handbook.pd [retrieved on Feb. 10, 2017].
Kristofer Jennings; "Chapter 9: Regression Diagnostics", Statistics 512: Applied Linear Models Lecture Notes, Apr. 22, 2015, pp. 1-21; Retireved from the Internet: UR:http://web.archive.org/web/20150422004553/http://www.stat.purdue.edu/jennings/stab514/stat512notes/topic5.pdf [retrieved on Feb. 10, 2017].
Julian Faraway; "Chapter 7: Diagnostics", Practical Regression and Anova using R, Jul. 2002, pp. 72-94. Retrieved from the Internet: URL:http://web.archive.org/web/20100628025654/http://www.biostat.jhsph.edu/~iruczins/teaching/jf/ch7.pdf [retrieved on Feb. 10, 2017].
William G Jacoby; "Regression III: Advanced Methods", Lecture 11: Outliers and Influential Data; 2005 ICPSR Summer Program, Jul. 13, 2005, pp. 1-43. Retrieved from the Internet: URL: http://web.archive.org/web/20150810225423/http://polisci.msu.edu/jacoby/icpsr/regress3/lectures/week3/11.Outliers.pdf [retrieved on Feb. 10, 2017].
Sudhir R. Paul; "Residual, Studentized", Wiley StatsRef: Statistics Reference Online, Sep. 29, 2014, pp. 339-348. Retrieved from the Internet: URL: http://onlinelibrary.wiley.com/doi/10.1002/9781118445112.stat07561/pdf [retrieved on Feb. 10, 2017].
"Protocal for Measuring Small Molecule Interactions Using Biacore a Practical Guide to Experimental Design and Data Evaluation", 2002. Retrieved from the Internet: URL: http://www.biacore.com/lifesciences/events/4214/index.html?section=lifesciences&realsection=lifesciences&d=12237&do=download&id=12245. [retrieved on Jul. 8, 2014].

* cited by examiner

METHOD AND SYSTEM FOR IMPROVING THE EVALUATION OF AN INTERACTION BETWEEN AN ANALYTE AND A LIGAND USING A BIOSENSOR

CROSS-REFERENCE TO RELATED APPLICATIONS

This application is a filing under 35 U.S.C. 371 of international application number PCT/EP2016/073271, filed Sep. 29, 2016, which claims priority to Great Britain application number GB1517279.4, filed Sep. 30, 2015, the entire disclosure of each of which is hereby incorporated by reference.

TECHNICAL FIELD

The present invention relates to a method and system for improving the evaluation of an interaction between an analyte in a fluid sample and a ligand immobilized on a sensor surface of a biosensor, and to software for performing the steps of the method and a computer readable medium for storing the software.

BACKGROUND

Analytical sensor systems that can monitor interactions between molecules, such as biomolecules, in real time are gaining increasing interest. These systems are often based on optical biosensors and usually referred to as interaction analysis sensors or biospecific interaction analysis sensors. A representative such biosensor system is the BIACORE® instrumentation sold by GE Healthcare, which uses surface plasmon resonance (SPR) for detecting interactions between molecules in a sample and molecular structures immobilized on a sensing surface. As sample is passed over the sensor surface, the progress of binding directly reflects the rate at which the interaction occurs. Injection of sample is followed by a buffer flow during which the detector response reflects the rate of dissociation of the complex on the surface. A typical output from the BIACORE® system is a graph or curve describing change in refractive index at the sensor surface and thereby the progress of the molecular interaction with time, including an association phase part and a dissociation phase part. This graph or curve, which is usually displayed on a computer screen, is often referred to as a binding curve or "sensorgram".

With the BIACORE® system (and analogous sensor systems) it is thus possible to determine a plurality of interaction parameters for the molecules used as ligand and analyte. These parameters include kinetic rate constants for binding (association) and dissociation in the molecular interaction as well as the affinity for the surface interaction. The association rate constant ($k_a$) and the dissociation rate constant ($k_d$) can be obtained by fitting the resulting kinetic data for a number of different sample analyte concentrations to mathematical descriptions of interaction models in the form of differential equations. The affinity (expressed as the affinity constant $K_A$ or the dissociation constant $K_D$) can be calculated from the association and dissociation rate constants.

Several factors may cause deviations in refractive index other than the intended interaction of molecules, most notably the solvent contained in the sample passed over the sensor surface. Solvent correction adjusts reference-subtracted responses for small artefacts that can be introduced by variations in the bulk refractive index between samples. The correction is generally required when variations in the bulk refractive index are of the same order of magnitude as the response: this situation arises commonly in work with small organic biomolecules that give intrinsically low response values and that often require organic solvents such as dimethyl sulfoxide (DMSO) to maintain solubility.

The need for solvent correction arises because subtraction of the reference response does not exactly eliminate the contribution of the bulk solution to the measured response. Bulk solution is excluded from the volume occupied by ligand on the active surface, so that the bulk contribution to the response on the active surface is slightly smaller than that on the reference surface. As long as the refractive index of the samples is constant, this excluded volume effect introduces a constant error in reference subtraction which may be ignored for practical purposes. However, if the refractive index of the samples varies, the magnitude of the excluded volume effect will also vary. Reference measurements are therefore performed at regular intervals by passing solvent samples containing the solvent at different known concentrations over the sensor surface and creating reference-subtracted response values. The quality of these measurements may be difficult to assess, however, and the results may be subjected to drift over time, making it difficult to achieve high quality interaction data.

There is therefore generally a need for improved methods to increase the quality when evaluating the interaction between molecules in a sample and molecules immobilized on a sensor surface.

DISCLOSURE OF THE INVENTION

The object of the invention is to provide a new method and biosensor system for improving the evaluation of an interaction between an analyte in a fluid sample and a ligand immobilized on a sensor surface of a biosensor, which method and biosensor system overcomes one or more drawbacks of the prior art.

One of the benefits of the invention is that the reference values may be assessed and outliers in the resulting data set may be identified and removed. The remaining values can be used with the solvent correction method or another similar method to improve the quality of results for the interaction between molecules obtained using surface plasmon resonance.

Many additional benefits of the invention will become readily apparent to the person skilled in the art in view of the detailed description below.

DRAWINGS

The invention will now be described in more detail with reference to the appended drawings, wherein.

DETAILED DESCRIPTION

As mentioned above, the present invention relates to a method and a biosensor system for evaluation of an interaction between an analyte in a fluid sample and a ligand immobilized on a sensor surface of a biosensor.

Typically, the experimental binding data is obtained by sensor-based technology, which studies the molecular interactions and presents the results in real time as the interactions progress. Before describing the present invention in more detail, however, the general context in which the invention is intended to be used will be described.

Unless defined otherwise, all technical and scientific terms used herein have the same meaning as commonly understood by a person skilled in the art related to this invention. Also, the singular forms "a", "an", and "the" are meant to include plural reference unless it is stated otherwise.

All publications, patent applications, patents, and other references mentioned herein are incorporated by reference in their entirety.

Chemical sensors or biosensors are typically based on label-free techniques, detecting a change in a property of a sensor surface, such as e.g. mass, refractive index, or thickness for the immobilized layer, but there are also sensors relying on some kind of labelling. Typical sensor detection techniques include, but are not limited to, mass detection methods, such as optical, thermo-optical and piezoelectric or acoustic wave methods (including e.g. surface acoustic wave (SAW) and quartz crystal microbalance (QCM) methods), and electrochemical methods, such as potentiometric, conductometric, amperometric and capacitance/impedance methods. With regard to optical detection methods, representative methods include those that detect mass surface concentration, such as reflection-optical methods, including both external and internal reflection methods, which are angle, wavelength, polarization, or phase resolved, for example evanescent wave ellipsometry and evanescent wave spectroscopy (EWS, or Internal Reflection Spectroscopy), both of which may include evanescent field enhancement via surface plasmon resonance (SPR), Brewster angle refractometry, critical angle refractometry, frustrated total reflection (FTR), scattered total internal reflection (STIR) (which may include scatter enhancing labels), optical wave guide sensors; external reflection imaging, evanescent wave-based imaging such as critical angle resolved imaging, Brewster angle resolved imaging, SPR-angle resolved imaging, and the like. Further, photometric and imaging/microscopy methods, "per se" or combined with reflection methods, based on for example surface enhanced Raman spectroscopy (SERS), surface enhanced resonance Raman spectroscopy (SERRS), evanescent wave fluorescence (TIRF) and phosphorescence may be mentioned, as well as waveguide interferometers (e.g. Bio-Layer Interferometry as implemented by ForteBio®), waveguide leaky mode spectroscopy, reflective interference spectroscopy (RIfS), transmission interferometry, holographic spectroscopy, and atomic force microscopy (AFR). Commercially available biosensors include the afore-mentioned BIACORE® system instruments, manufactured and marketed by GE Healthcare, which are based on surface plasmon resonance (SPR) and permit monitoring of surface binding interactions in real time between a bound ligand and an analyte of interest. In this context, "ligand" is a molecule that has a known or unknown affinity for a given analyte and includes any capturing or catching agent immobilized on the surface, whereas "analyte" includes any specific binding partner thereto.

While in the detailed description, the present invention is illustrated in the context of SPR spectroscopy, and more particularly the BIACORE® system, it is to be understood that the present invention is not limited to this detection method. Rather, any affinity-based detection method where an analyte binds to a ligand immobilized on a sensing surface may be employed, provided that a change at the sensing surface can be measured which is quantitatively indicative of binding of the analyte to the immobilized ligand thereon.

The phenomenon of SPR is well known, suffice it to say that SPR arises when light is reflected under certain conditions at the interface between two media of different refractive indices, and the interface is coated by a metal film, typically silver or gold. In the BIACORE® instruments, the media are the sample and the glass of a sensor chip, which is contacted with the sample by a micro fluidic flow system. The metal film is a thin layer of gold on the chip surface. SPR causes a reduction in the intensity of the reflected light at a specific angle of reflection. This angle of minimum reflected light intensity varies with the refractive index close to the surface on the side opposite from the reflected light, in the BIACORE® system the sample side.

Figure 1:
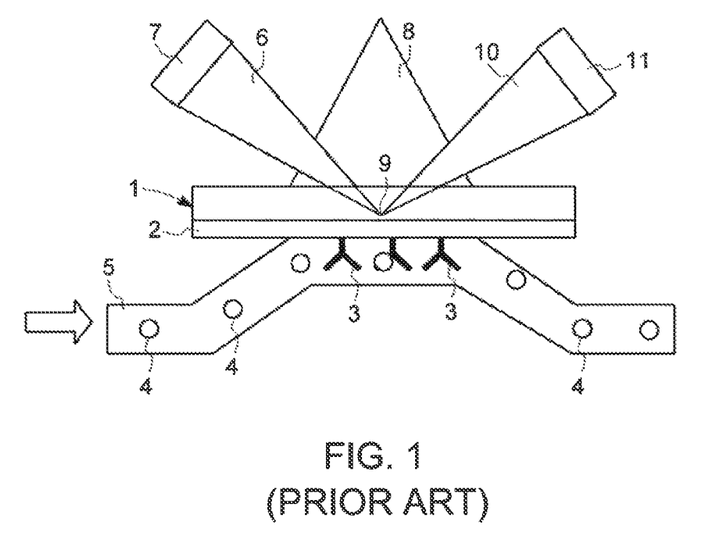
FIG. 1 is a schematic side view of a biosensor system based on SPR.

A schematic illustration of the BIACORE® system is shown in FIG. 1. Sensor chip 1 has a gold film 2 supporting capturing molecules (ligands) 3, e.g. antibodies, exposed to a sample flow with analytes 4, e.g. an antigen, through a flow channel 5. Monochromatic p-polarized light 6 from a light source 7 (LED) is coupled by a prism 8 to the glass/metal interface 9 where the light is totally reflected. The intensity of the reflected light beam 10 is detected by an optical detection unit 11 (photodetector array).

Figure 2:
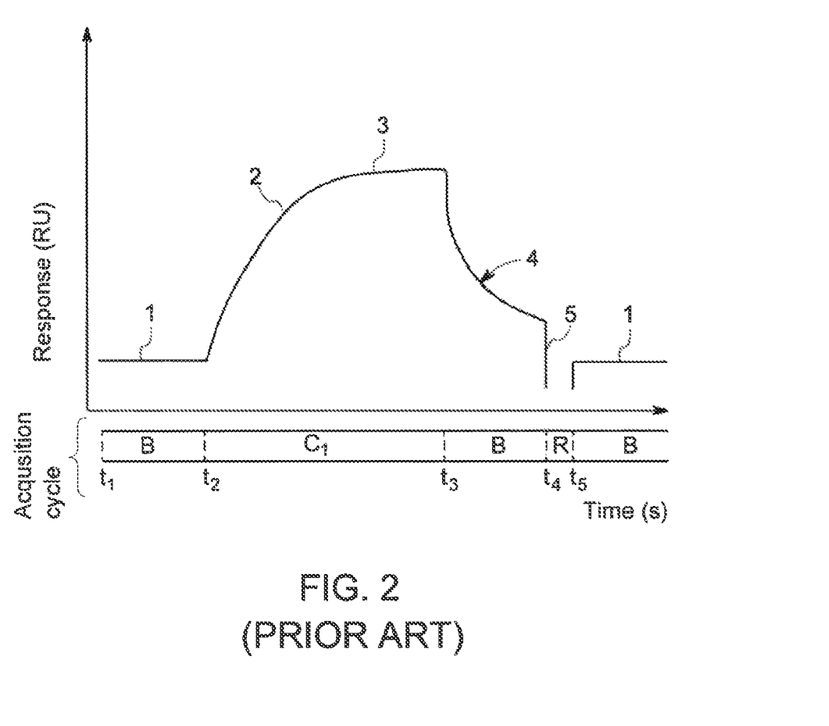
FIG. 2 is a representative sensorgram where the binding curve has visible association and dissociation phases.

A detailed discussion of the technical aspects of the BIACORE® instruments and the phenomenon of SPR may be found in U.S. Pat. No. 5,313,264. More detailed information on matrix coatings for biosensor sensing surfaces is given in, for example, U.S. Pat. Nos. 5,242,828 and 5,436,161. In addition, a detailed discussion of the technical aspects of the biosensor chips used in connection with the BIACORE® instruments may be found in U.S. Pat. No. 5,492,840. When molecules in the sample bind to the capturing molecules on the sensor chip surface, the concentration, and therefore the refractive index at the surface changes and an SPR response is detected. Plotting the response against time during the course of an interaction will provide a quantitative measure of the progress of the interaction. Such a plot, or kinetic or curve (binding isotherm), is usually called binding curve or sensorgram, also sometimes referred to in the art as "affinity trace" or "affmogram". In the BIACORE® system, the SPR response values are expressed in resonance units (RU). One RU represents a change of 0.0001° in the angle of minimum reflected light intensity, which for most proteins and other bio molecules correspond to a change in concentration of about 1 pg/mm^ the sensor surface. As sample containing an analyte contacts the sensor surface, the capturing molecule (ligand) bound to the sensor surface interacts with the analyte in a step referred to as "association." This step is indicated in the binding curve by an increase in RU as the sample is initially brought into contact with the sensor surface. Conversely, "dissociation" normally occurs when the sample flow is replaced by, for example, a buffer flow. This step is indicated in the binding curve by a drop in RU over time as analyte dissociates from the surface-bound ligand. A representative binding curve (sensorgram) for a reversible interaction at the sensor chip surface is presented in FIG. 2, the sensing surface having an immobilized capturing molecule, or ligand, for example an antibody, interacting with a binding partner therefore, or analyte, in a sample. The binding curves produced by biosensor systems based on other detection principles mentioned above will have a similar appearance. The vertical axis (y-axis) indicates the response (here in resonance units, RU) and the horizontal axis (x-axis) indicates the time (here in seconds). Below the horizontal axis, the acquisition cycle for acquiring a binding curve is schematically disclosed divided in different time sections where the sensor surface is put into contact with different fluids. Initially, from to t1 to t2, buffer (B) is passed over the sensing surface giving the baseline response 1 in the binding curve. Then, during from t2 to t3, the sensor surface is contacted with a sample containing an analyte at a concentration Ci whereby an increase in signal is observed due to binding of the analyte. This part 2 of the binding curve is usually referred to as the "association phase". Eventually, a steady state condition is reached at or near the end of the association phase where the resonance signal plateaus at 3 (this state may, however, not always be achieved). It is to be noted that herein the term "steady state" is used synonymously with the term "equilibrium" (in other contexts the term "equilibrium" may be reserved to describe the ideal interaction model, since in practice binding could be constant over time even if a system is not in equilibrium). At the end of the association phase, at t3, the sample is often replaced with a continuous flow of buffer (B) and a decrease in signal reflects the dissociation, or release, of analyte from the surface. This part 4 of the binding curve is usually referred to as the "dissociation phase". The analysis is optionally ended by a regeneration step, at t4, where a solution capable of removing bound analyte from the surface (R), while (ideally) maintaining the activity of the ligand, is injected over the sensor surface. This is indicated in part of the sensorgram. At $t_5$ injection of buffer (B) restores the baseline I and the surface is now ready for a new analysis. In some situations it may be convenient to omit the regeneration step V and initiate a new injection cycle without regeneration. Examples of such situations comprise concentration series of the same analyte, screening of analytes with a sufficiently high dissociation rate to allow essentially complete dissociation, etc. From the profiles of the association and dissociation phases II and IV, respectively, information regarding the binding and dissociation kinetics is obtained, and the height of the binding curve at III represents affinity (the response resulting from an interaction being related to the change in mass concentration on the surface).

Solvent correction (SC) is a procedure that corrects for sample-to-sample variations in bulk effects, which can introduce significant reference subtraction errors. These effects arise because reference and ligand surfaces are structurally different. Bulk solution is excluded from the volume occupied by ligand molecules on the ligand surface, effectively reducing potential bulk effects. Correction often becomes important for samples including small molecules stored in organic solvents such as DMSO, which can dramatically affect the refractive index of the solution. The approach of SC is to measure the response on both ligand and reference surface during injections of blank samples containing a range of DMSO concentrations. Such runs are performed cyclically in between sample runs to correct for any drifts in the response. For each SC run, the reference-subtracted response on the ligand is then plotted against the reference response, and a quadratic polynomial is fit to the data. Each sample measurement is corrected by the factor obtained by measuring the reference response during the sample injection and reading off the SC curve what ligand-reference difference this corresponds to.

Thus, certain factors must be considered when assessing the quality of data gathered by the Solvent Correction method. Specifically, $\chi^2$, is a measure of the statistical error of the measurements (detailed definitions and description of terminology are found below). A large $\chi^2$ can indicate that outliers, data points which do not follow the general trend of the data, are present. In addition, the intersection of the SC curve with the y-axis, $Y_0$, can be used as a quality indicator. Ideally, $Y_0$ should be close to zero. How big a $Y_0$ deviation from zero should be considered significantly large is however difficult to quantify at the stage at which Solvent Correction (SC) is performed.

The regression analysis technique currently utilized in the Biacore 4000 SC procedure is linear least squares, using a quadratic polynomial model:

$$y(x)=ax^2+bx+c,$$

where $c=Y_0$. The number of regression parameters, p, thus adds up to 3. A normally distributed error term, responsible for the statistical uncertainties of the measurements, should also be added to this expression. The mean of this error should be zero, but more interestingly, the variance, $\chi$ (sometimes also referred to as MSE, "mean square error") can be estimated from a data set $(x_i, y_i)$, i=1, . . . , n, as $$\chi^2 = \sum_{i=1}^{n} e_i^2/(n-p).$$

The $e_i$ are residuals defined by $e_i=y_i-f_i$, where $f_i=f(x_i)$ is a prediction of $y(x_i)$ made by the regression curve f(x). The residuals and $\chi^2$ measure deviations in the y-direction. The corresponding variables for the x-direction are the leverages, $h_i$. These are defined as the diagonal elements of the so called "Hat matrix", H, given by $$H=X(X^TX)^{-1}X^T,$$

where X is the n×p so called design matrix of the regression. Specifically, for quadratic regression, which is the most relevant here, $$X = \begin{bmatrix} 1 & x_1 & x_1^2 \\ \vdots & \vdots & \vdots \\ 1 & x_n & x_n^2 \end{bmatrix}.$$

This means we can write the leverages as $$h_i=X_i(X^TX)^{-1}X_i^T.$$

where $X_i$ is the ith row vector of X, corresponding to observation i. A high leverage for a certain data point (note: since here, $0 \leq h_i \leq 1$, "high" means close to 1) means that it is located far away from the main mass of data in the x-direction. As the name suggests, high-leverage points force the regression curve to pass by very close to them.

An outlier is here defined as an observation that does not fit with the pattern displayed by the majority of the remaining observations. The presence of outliers in the data set used for SC would introduce disturbance in the results of the interaction between analyte and ligand. For the purpose of the invention it is to be distinguished between two types of outliers: large residual points and bad leverage points. Large residual points are outliers only in the y-direction, while bad leverage points are outliers in both directions. In addition, there are good leverage points, which are only outliers in the x-direction.

It is possible to attack the problem of outliers in at least two different ways. Either one can 1) use a outlier-resistant robust regression technique that pays less attention to extreme points from the start, or, 2) one applies least squares (LS), and from there tries to detect suspicious points by the use of some regression diagnostic. This section focuses on approach 2).

To find large residual points it is natural to look at the residual $e_i$ of each point, scaled (divided) by an estimate of the standard deviation of the residual, which is a function of the leverage $h_i$. This measure is called the internally Studentized residual and is given by $$t_i^{int} = \frac{e_i}{\chi\sqrt{1-h_i}}.$$

In addition, many popular regression diagnostics are based on a "one-deletion" procedure, the question being: how does the deletion of one single observation affect the regression? Removing an outlier should in general greatly impact the regression. An example of such a diagnostic is the externally Studentized residual, defined by $$t_i^{ext} = \frac{e_i}{\chi_{(i)}\sqrt{1-h_i}},$$

where a subscript (i) will always indicate that the calculations have been made using the data set with point i deleted. Basically $t_i^{ext}$ is the residual scaled by its standard deviation, but with $\chi$ replaced by its one-deletion partner. Under the assumption of independent, Gaussian errors (which will always be assumed), this statistic follows a t-distribution with (n−p−1) degrees of freedom.

In addition to such residual measures, several so called "influence" measures may be used, which attempt to capture how much power a certain point has over the regression. One example is DFFITS, given by $$DFFITS_i = \frac{|f_i - f_{i(i)}|}{\chi_{(i)}\sqrt{h_i}},$$

where $f_{i(i)}$ is the regression function with point i deleted, evaluated at $x=x_i$. It can be shown that DFFITS is simply related to $t_i^{ext}$ by $$DFFITS_i = t_i^{ext}\sqrt{\frac{h_i}{1-h_i}},$$

i.e., a large Studentized residual combined with high leverage are typical characteristics of an influential point.

After having reviewed one-deletion diagnostics, it is natural to consider the reversed situation of one-inclusion diagnostics. Given an initial data set, with what certainty can we predict the value of a new observation $y_i$ using a regression based on these initial observations? A statistic similar to $t_i^{ext}$ can here be useful, namely the prediction residual $t_i^{pred}$, defined by $$t_i^{pred} = \frac{e_i}{\chi\sqrt{1+h_i}},$$

where $h_i$ is a generalization of the leverage defined previously. The definition of $h_i$ remains the same, except for the important fact that for this case, the row vector $X_i$ will not be a row of the matrix of regression, X, since X only contains the rows corresponding the initial and not the "new" observation (also, when $X_i$ is not a row of X, $h_i>1$ is possible). $t_i^{pred}$ has a t-distribution with (n−p) degrees of freedom.

The method and system according to the invention will now be described in more detail, followed by an experiment to evaluate the method using a number of curves obtained using the solvent correction method. It is to be noted, however, that the method may also be used with data obtained through other methods and that the embodiments described below are not to be seen as limiting the invention. The preferred embodiment is described using the Biacore® 4000 system to obtain the results, but it is to be noted that other systems may of course also be used.

Thus, according to a preferred embodiment of the present invention a biosensor system is provided with a first sensor surface and a second sensor surface on which a ligand is immobilized. The first sensor surface is provided without any immobilized molecules on its surface. A plurality of fluid samples are allowed to flow across the first and second sensor surface and changes in refractive index are measured for each sample. The fluid samples comprise a solvent, preferably an organic solvent such as DMSO that is also used for containing the analyte used for interaction with the ligand, and the solvent is present at a plurality of different known concentrations.

For each fluid sample a reference value and a reference-subtracted response value are created, where the reference value is the measured response at the second sensor surface and the reference-subtracted response value is the response at the second sensor surface subtracted by the response at the first sensor surface. A data set is created with the reference value and the reference-subtracted response value forming a point for each fluid sample.

Figure 3:
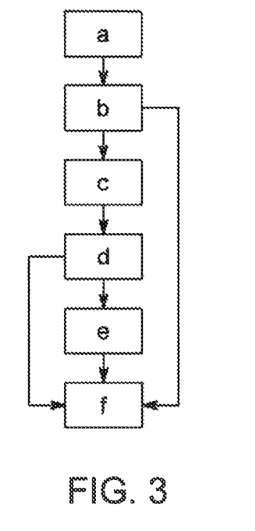
FIG. 3 shows steps of the method according to a preferred embodiment of the invention.
Figure 4A:
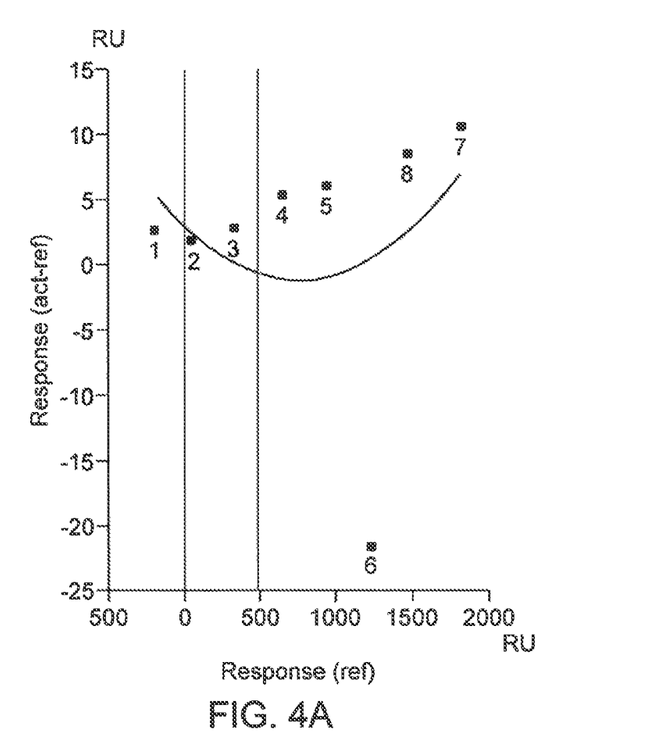
FIGS. 4a-4h disclose eight sample curves that were used to test the method
Figure 4B:
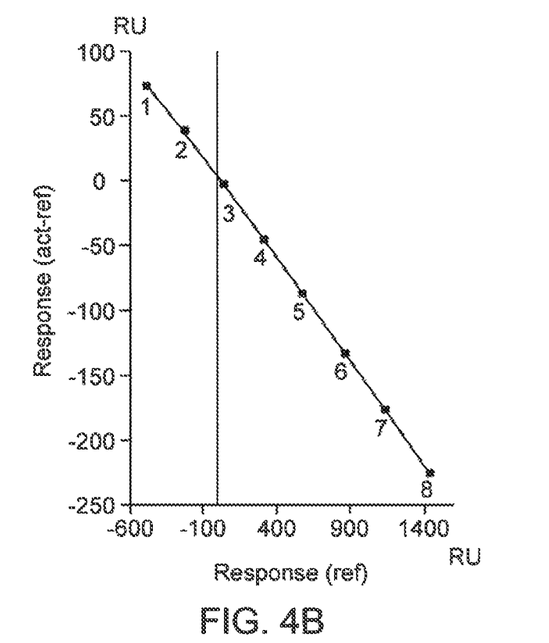
Figure 4C:
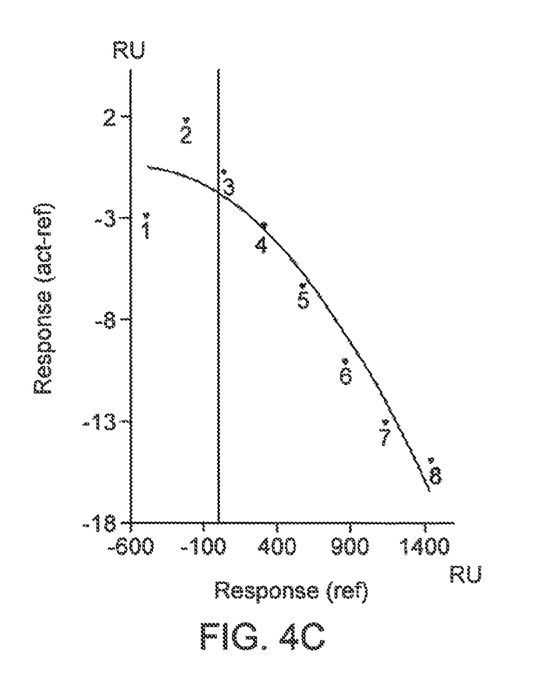
Figure 4D:
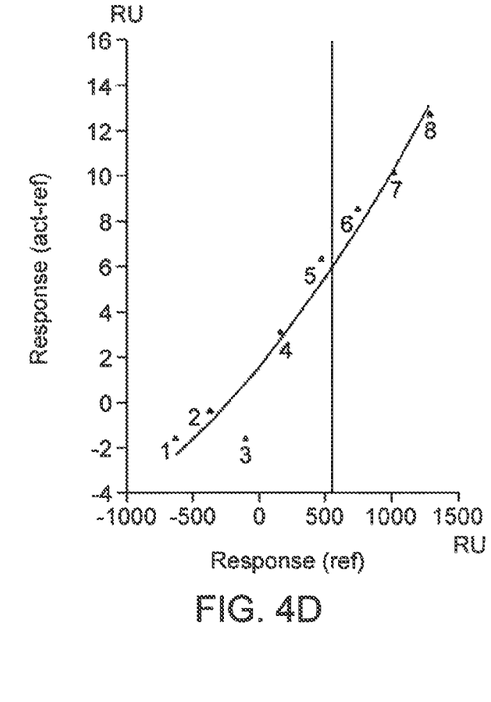
Figure 4E:
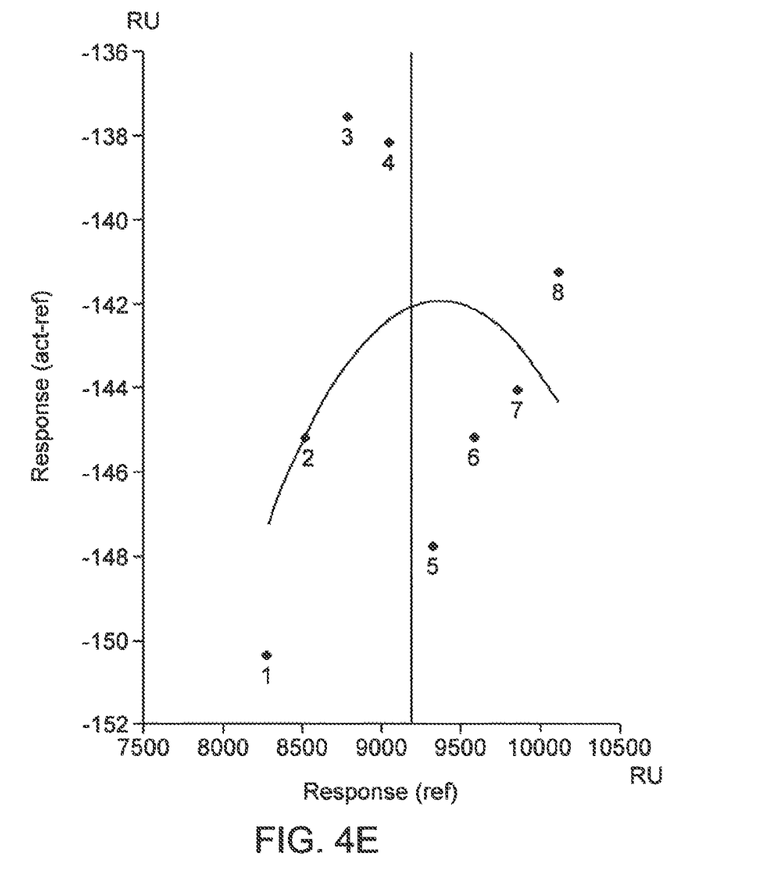
Figure 4F:
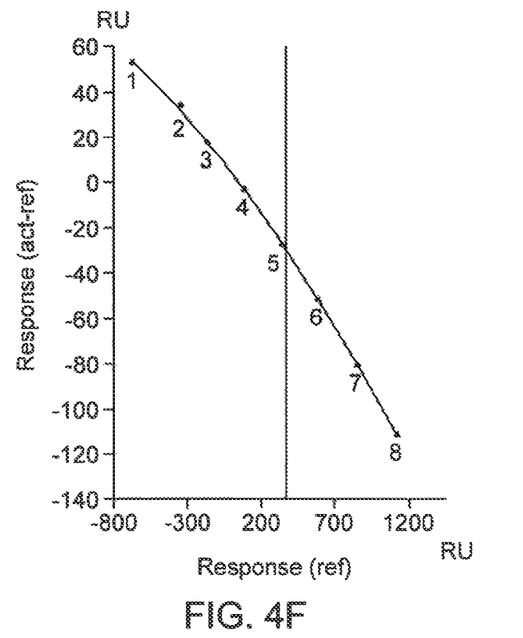
Figure 4G:
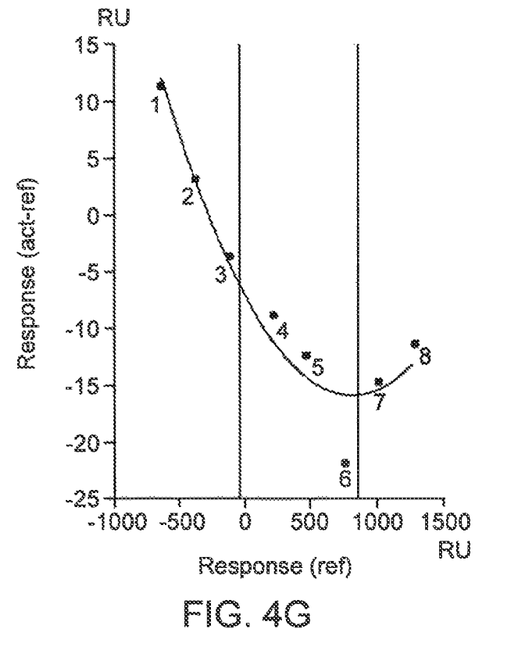
Figure 4H:
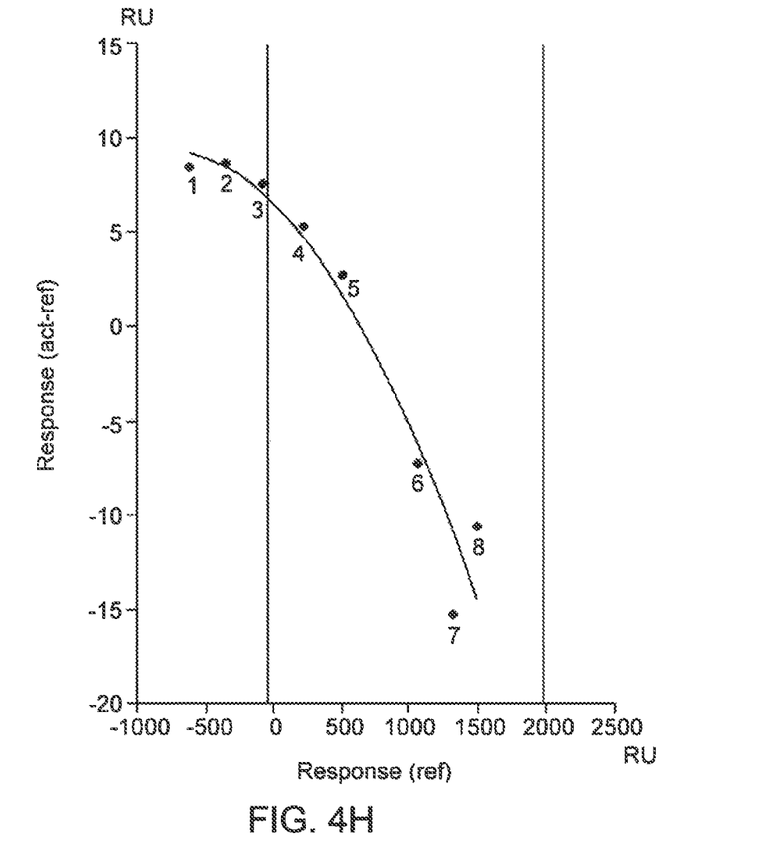

From the data set a reliable set is chosen comprising at least four samples and the reference value for each point is plotted against the reference-subtracted value and a curve fitted to them using any suitable method such as a polynomial fitting for instance. The remaining points in the data set are tested against the reliable set using the steps a)-f) as described further below to determine if any of them are outliers and should be removed from the set to increase the quality of results. For each point the following steps a)-f) are therefore performed, and the steps are also shown by FIG. 3.

a) calculating the leverages $h_i$.

b) labelling points with $h_i>h_i^{cut}$ as outliers. If the number of outliers, $n_o$, is less than $n_o^{max}=\min(n-p-1, \mathrm{floor}((n-1)/2))$, continue; otherwise, go to step f) below, c) forming a clean set with any outliers removed and calculating the $n^{clean}$ Studentized residuals $t_i^{ext}$ using a regression based on this clean set, where $n^{clean}$ is the size of the clean set, d) labelling points with $t_i^{ext}>t(\alpha/(2n^{clean}), n^{clean}-p-1)$ as outliers and if $n_o<n_o^{max}$, continue; otherwise, go to step f) below, e) forming a clean set with outliers removed again, if outliers were found in the previous step d). If $\chi^2>\chi^2_{cut}$, where $\chi^2$ is calculated from regression of the clean set, calculating the $n^{clean}$ Studentized residuals $t_i^{ext}$ for all points in the clean set and labelling outliers just as was done in the previous step d), f) if any high-leverage outliers were detected in step b) and $n_o \leq n_o^{max}$, calculating $t_i^{pred}$ for these high-leverage points using a regression based on the clean, outlier-free set, and removing the outlier label for this points if $t_i^{pred} < t(\alpha/2, n^{clean}-p)$.

The heart of the algorithm is the Studentized residual t-test of steps c) and d). Here, a so called Bonferroni correction of the significance level a is used to account for the fact that actually $n^{clean}$ significance tests are being performed, increasing the probability of finding something "abnormal" than if only one randomly chosen point were tested. In order to prevent high-leverage points, which may distort the regression curve from disturbing these tests they are temporarily labeled as outliers during steps a)-b) and removed from the clean set. In step f) each of these points is classified as a good leverage points (not outlier) or a bad leverage points (outlier) based on whether it falls within the prediction interval of the "clean" regression or not, at a significance level a that may be selected as desired.

A common problem of regression is the effect of "masking", that is, when the presence of one outlier can help to hide, i.e. mask, the presence of another outlier. Step e) serves to solve this problem. If any outliers were detected in step d), and the resulting $\chi^2$ for the remaining set of points is still considered large, i.e., $\chi^2 > \chi^2_{cut}$, another large-residual t-test is performed. This cut-off is included to avoid excessive "trimming" of the curves, and so that another residual test is only performed for certain cases. $\chi^2_{cut}$ could for instance be set to a value that is large as compared to the current set of SC curves. One outlier-robust way of doing this is to set $$\chi_{cut}^2 = \chi_{rel}^2 = \text{med}(\chi_j^2) + m\text{MAD}(\chi_j^2).$$

where $\chi_j^2$ is $\chi^2$ of the jth SC curve included in the SC analysis (as calculated from the full data set), "med" denotes the median, and m is a non-negative integer determining how far away from the median is to be considered too large. MAD is the mean absolute deviation, a robust variant of the usual standard deviation, defined by $$\text{MAD}(\chi_j^2) = \text{med}(\chi_j^2 - \text{med}(\chi_j^2))$$

When using $\chi_{rel}^2$ it may be that a set of relatively small $\chi_j^2$'s could give a quite small $\chi_{cut}^2$ (e.g. <1 RU$^2$). Furthermore, where only a small number of curves are included in the analysis, the results may not be statistically significant. Hence, an alternative is to set $\chi_{cut}^2$ to a fixed constant $\chi_0^2$, say ~10 RU$^2$, making sure that a masking test will never be performed if $\chi^2 < \chi_0^2$. A potential problem with only using $\chi_0^2$ is that a set of relatively large $\chi_j^2$'s could lead to unwanted and unnecessary masking tests. These alternatives may therefore be combined by setting $$\chi_{cut}^2 = \max(\chi_0^2, \chi_{rel}^2)$$

if there are sufficiently many curves (say, 5) for the relative measure to be reasonable, and setting $\chi_{cut}^2 = \chi_0^2$ otherwise. In order to further improve the method with regard to detecting outliers, an additional step may be added, namely g) calculating the DFFITS for each point and labeling points with DFFITS$_i > f(t(\alpha/(2n^{clean}), n^{clean}-p-1), h_i^{cut})$ as outliers. If the number of outliers, $n_o$, is less than $n_o^{max} = \min(n-p-1, \text{floor}((n-1)/2))$, continue; otherwise, go to step f).

This step is preferably inserted at the beginning of the method, before or after any of the steps a) and b) and provide an additional labelling of data points suspected of being outliers. Furthermore, data that show different slope inside a data point compared to other points have been shown in studies to be potential outliers. A point solvent correction value is calculated from a baseline in the sensorgram and a specific point area inside the solvent correction inject. The point value is calculated as the average of the specific point area–baseline.

An additional procedure can be used with the preferred embodiment of the present invention to further identify outliers through the steps of i) Calculating a slope for all point area data inside each point.
ii) Calculating a difference between average and median of the data inside each point.
iii) Calculating a difference between the slope calculated in step i) and median of all slopes calculated in step i).
iv) Sorting the data from step iii).
v) Determining a clean set of the sorted data from step iv) by removing data with largest difference to median
vi) Using the clean set to calculate normal difference to median
vii) Classifying a point as outlier if difference against median is larger than a first predetermined value and data from step ii) is larger than a second predetermined value.

By applying these steps a clean set is also created and can serve as input to the method steps a)-f) or a)-g). Preferably, said first predetermined value is 20 times the value determined in step vi) and the said second predetermined value is 1 RU.

Experiment

The method according to the present invention will now be evaluated by using the steps a)-f) on 8 different SC curves obtained through the Solvent Correction (SC) method as described above. The curves themselves are denoted by numbers 1-8 and shown by FIG. 4a-4h. All the curves have $\chi^2 > 1$ RU$^2$, since this is a reasonable cut-off to choose as a "good enough" $\chi^2$.

The settings of the parameters from the method steps a)-f) when running this test were: $h_i^{cut} = 0.85$, $\chi_0^2 = 10$ RU$^2$ and m=5. The two lower significance levels, 1% and 5%, are applied in turn.

The results are summarized in table 1 below. Here each curve is listed with its $\chi^2$, and for each significance level, the indices of the points (as defined in the figures of the curves in FIG. 4a-4h) which were identified as outliers by the method. The right-most column contains the indices of the "true" outliers. A '-' denotes that no outliers were detected for that significance level and method.

The final row of table 1 lists the number of detected true outliers for the test of the corresponding column. This number provides a rough measure of how well the different significance levels are doing. Specifically, it is seen that the stricter 1% level makes the method miss more or less half of the apparent outliers, while the 5% level allows the method to find almost all of them. All of the detections made in this experiment lead to a dramatic relative decrease in $\chi^2$ after removal of the proposed outliers. Of all tests which lead to outlier detections, the test resulting in the minimum relative decrease nonetheless decreased $\chi^2$ by 85%, while the average decrease was by 95%. Thus, according to this $\chi^2$-measure, all suspicions are well-grounded. In reality however, absolute measures are important. To facilitate the evaluation of the method in terms of absolute RUs, FIGS. 5a-5h contain a bar chart for each curve, with the original $\chi^2$ value and the resulting χ2 reductions after outlier removal for each significance level.

TABLE 1

Results of the experiment on 8 different curves.

| Curve | $\chi^2$ (RU$^2$) | α = 1% | α = 5% | "True" outliers |
|---|---|---|---|---|
| 1 | 128.8 | 6 | 6 | 6 |
| 2 | 1.988 | — | 1 | 1 |
| 3 | 4.101 | — | 1 | 1 |
| 4 | 1.791 | — | 3 | 3 |
| 5 | 23.43 | — | — | — |
| 6 | 1.491 | — | 2 | — |
| 7 | 10.08 | 6 | 6 | 6 |
| 8 | 7.338 | — | 8 | 8 |

The curves and the results in Table 1 can further be described as follows:

Curve 1 (FIG. 4a): Point 6 is an obvious outlier, and the method detects this point at both α levels.

Curve 2 (FIG. 4b): The method detects that point 1 is an outlier on the 5% level. Even though it looks like a fine fit to the eye, excluding this point actually leads to a significantly lower $\chi^2$ of ~0.16 RU$^2$, which is essentially what triggers the method to declare the presence of outliers. Deleting point 1 gives the curve a $\chi^2$<0.6 RU$^2$.

Curve 3 (FIG. 4c): For this curve it is quite clear that point 1 is an outlier and it is identified as such on the 5% level but not on the 1% level.

Curve 4 (FIG. 4d): Point 3 is an outlier. Indications such as a steep report point region are found upon inspection of the sensorgram. The method successfully detects this point for α=5%.

Curve 5 (FIG. 4e): This curve contains no obvious outliers and the same conclusion is drawn by both outlier tests.

Curve 6 (FIG. 4f): The method comes to the conclusion that point 2 is a 5% level outlier, even though it is not apparent to the naked eye. Deleting it leads to a $\chi^2$ decrease from 1.491 to 0.3323 RU$^2$.

Curve 7 (FIG. 4g): This curve exhibits a distinct outlier, which is detected already at α=1%.

Curve 8 (FIG. 4h): Again, the method identifies the outlier as point number 8.

It can therefore be concluded that the method according to the present invention is suitable for identifying outliers in a clear majority of the curves on which it was tested, and that a higher level of α=5% gives improved results compared with a lower level of 1%.

The steps of the method may be performed by software running in a processor, and said software may also be stored in a computer readable medium. The term computer readable medium as used herein is to be understood as any medium suitable for storing data for access by a computer or similar tool, such as an RAM, a memory stick, a compact disc, etc.

The invention has been described above with reference to the solvent correction method, but it is to be noted that the method according to the invention can also be used in other situations, such as when determining affinity for example.

Figure 5:
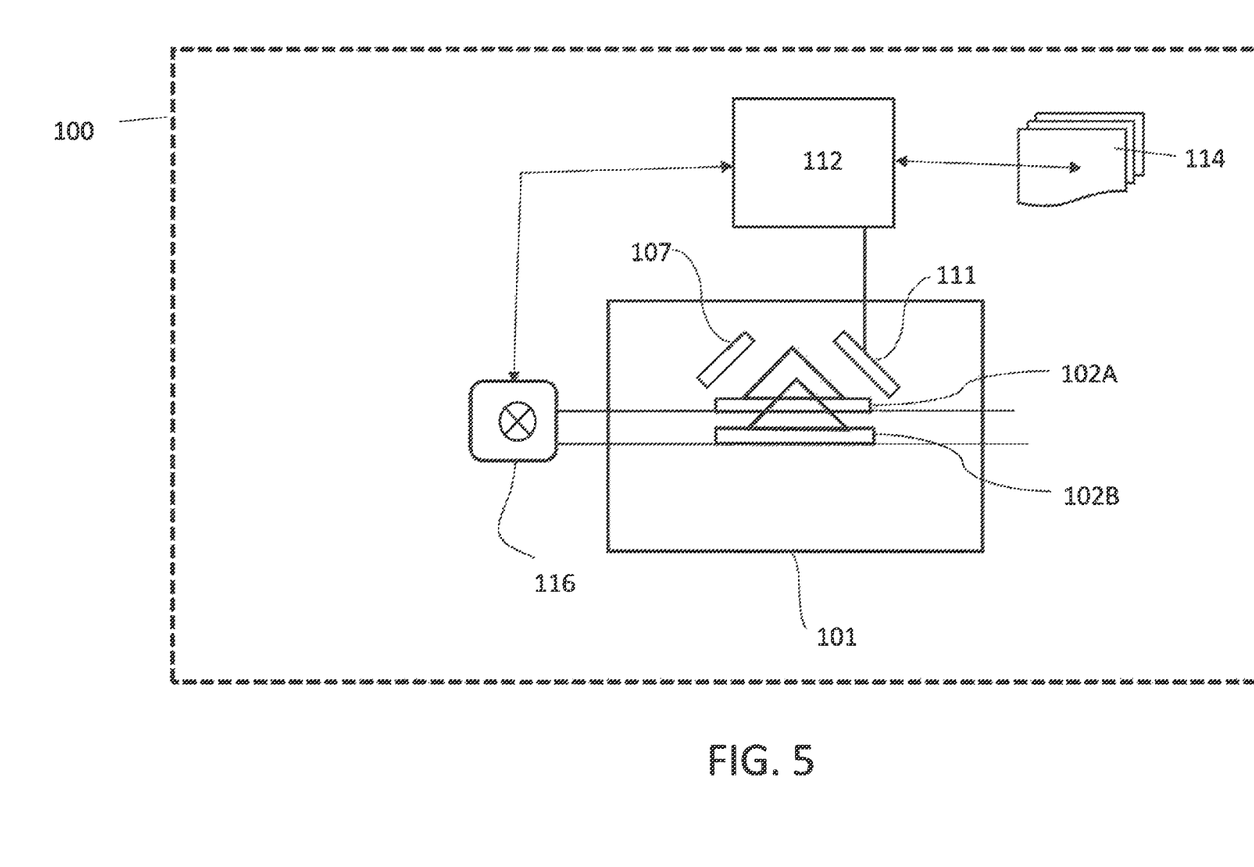
FIG. 5 shows a biosensor instrument according to an embodiment of the invention.

FIG. 5 shows a biosensor instrument 100 according to the invention, including a biosensor 101 which can be constructed as shown in FIG. 1 and operated in a manner described above with reference to FIG. 1, except that two parallel sensor surfaces 102A and 102B are used in this embodiment, each of which has the same construction as described above, although they are served by one light source 107 and light intensity is measured by different parts of the same light detector 111. A processor 112 for carrying out the method described above receives signals from light detector 111 derived from both sensor surfaces 102A and 102B operable in a similar way to the detector 11 shown in FIG. 1. The processor controls the flow of sample fluids to each sensor surface, at pump 116 and can read and write data form and to a memory 114. In this way the instrument can operate as claimed by means of software running in the processor 112.

The invention claimed is:

1. A method for improved evaluation of an interaction between an analyte in a fluid sample and a ligand immobilized on a sensor surface of a biosensor, comprising the steps of:
    providing a first sensor surface, and providing a second sensor surface having a ligand immobilized thereon,
    allowing a plurality of fluid samples to flow across said first and said second sensor surface wherein the fluid samples comprise a solvent at known concentration,
    measuring changes of refractive index at the first and second sensor surface during the flow of each fluid sample,
    determining a response value and a reference-subtracted response value for each fluid sample based on said changes and creating a data set comprising said values, each fluid sample forming a point in the data set,
    selecting a reliable set comprising at least five samples from the data set, plotting the response value against the reference-subtracted response value for the reliable set and fitting a curve to them,
and further comprising steps a)-f) below, said steps being performed in alphabetical order for every other fluid sample in the data set
    a) calculating leverages $h_i$,
    b) labelling points with $h_i$>$h_i^{cut}$ as outliers, and if the number of outliers, $n_o$, is less than $n_o^{max}$=min(n-p-1, floor((n-1)/2)), continue; otherwise, go to step f) below,
    c) forming a clean set with outliers removed and calculating $n^{clean}$ Studentized residuals $t_i^{ext}$ using a regression based on this clean set, where $n^{clean}$ represents size of the clean set,
    d) labelling points with $t_i^{ext}$>t(a/(2$n^{clean}$), $n^{clean}$-p-1) as outliers, and if $n_o$<$n_o^{max}$, continue; otherwise, go to step f) below,
    e) forming a clean set with outliers removed again, if outliers were found in previous step d); if $\chi^2$>$\chi^2_{cut}$, where $\chi^2$ is calculated from regression of the clean set, calculating the $n^{clean}$ Studentized residuals $t_i^{ext}$ for all points in the clean set and labelling outliers just as was done in previous step d),
    f) if any high-leverage outliers were detected in step b) and $n_o$<$n_o^{max}$, calculating $t_i^{pred}$ for these high-leverage points using a regression based on the clean, outlier-free set, and removing the outlier label for these points if $t^{red}$<t(α/2, $n^{clean}$-p).

2. The method according to claim 1, wherein the method further comprises the steps of:
    g) calculating an influence measure, referred to as DFFITS, for each point and labeling points with DFFITS$_i$>f(t(α/(2$n^{clean}$), $n^{clean}$-p-1), $h_i^{cut}$) as outliers; if the number of outliers, $n_o$, is less than $n_o^{max}$=min(n-p-1, floor((n-1)/2)), continue; otherwise, go to step f), and wherein said step g) is performed before or after any of the steps a) and b).

3. The method according to claim 1, wherein the method further comprises determining a clean set by i) calculating a slope for all point area data inside each point,
ii) calculating a difference between average and median of the data inside each point,
iii) calculating a difference between the slope calculated in step i) and median of all slopes calculated in step i),
iv) sorting the data from step iii),
v) determining a clean set of the sorted data from step iv) by removing data with largest difference to median,
vi) using the clean set to calculate normal difference to median,
vii) classifying a point as outlier if difference against median is larger than a first predetermined value and data from step ii) is larger than a second predetermined value.

4. The method according to claim 3, wherein said first predetermined value is 20 times the value determined in step vi).

5. The method according to claim 3, wherein said second predetermined value is 1 resonance units.

6. The method according to claim 1, wherein $\chi^2 = \max(\chi_o^2, \chi_{rel}^2)$.

7. The method according to claim 1, wherein the solvent is an organic solvent, preferably dimethyl sulfoxide.

8. A biosensor system, comprising a processor, for improved evaluation of an interaction between an analyte in a fluid sample and a ligand immobilized on a sensor surface of a biosensor, characterized in being arranged to perform the steps of the method according to claim 1.

9. A biosensor instrument for evaluation of an interaction between an analyte in a fluid sample and a ligand immobilized on a sensor surface of a biosensor, the instrument having a biosensor including a first sensor surface, and a second sensor surface having a ligand immobilized thereon,
   means for causing a plurality of fluid samples to flow across said first and said second sensor surface wherein the fluid samples comprise a solvent at known concentration, a
   a measuring device for measuring changes of refractive index at the first and second sensor surface during the flow of each fluid sample,
   a processor operable to determine a response value and a reference-subtracted response value for each fluid sample based on said changes and creating a data set comprising said values, each fluid sample forming a point in the data set and for selecting a reliable set comprising at least five samples from the data set, plotting the response value against the reference-subtracted response value for the reliable set and fitting a curve to them, the processor being further operable to carry out steps a)-f) below, said steps being performed in alphabetical order for every other fluid sample in the data set:
   a) calculating leverages $h_i$,
   b) labelling points with $h_i > h_i^{cut}$ as outliers, and if the number of outliers, no, is less than $n_o^{max} = \min(n-p-1, \text{floor}((n-1)/2))$, continue; otherwise, go to step f) below,
   c) forming a clean set with any-outliers removed and calculating $n^{clean}$ Studentized residuals $t_i^{ext}$ using a regression based on this clean set, where $n^{clean}$ represents size of the clean set,
   d) labelling points with $t_i^{ext} > t(a/(2n^{clean}), n^{clean}-p-1)$ as outliers, and if $n_o < n_o$ max, continue; otherwise, go to step f) below,
   e) forming a clean set with outliers removed again, if outliers were found in previous step d); if $\chi^2 > \chi^2_{cut}$, where $\chi^2$ is calculated from regression of the clean set, calculating the $n^{clean}$ Studentized residuals $t_i^{ext}$ for all points in the clean set and labelling outliers just as was done in previous step d),
   f) if any high-leverage outliers were detected in step b) and $n_o \le n_o^{max}$, calculating $t_i^{pred}$ for these high-leverage points using a regression based on the clean, outlier-free set, and removing the outlier label for these points if $t^{red} < t(\alpha/2, n^{clean}-p)$,
   thereby improving the evaluation of an interaction between an analyte in a fluid sample and a ligand immobilized on a sensor surface of a biosensor.

* * * * *